(12) United States Patent
Darcy

(10) Patent No.: US 9,400,398 B2
(45) Date of Patent: Jul. 26, 2016

(54) MODULAR EYEGLASSES WITH INTERCHANGEABLE TEMPLES AND FACADES

(71) Applicant: Jessica Darcy, Rockville Centre, NY (US)

(72) Inventor: Jessica Darcy, Rockville Centre, NY (US)

(73) Assignee: FUNOOGLES, LLC, Franklin Square, NY (US)

( * ) Notice: Subject to any disclaimer, the term of this patent is extended or adjusted under 35 U.S.C. 154(b) by 55 days.

(21) Appl. No.: 13/998,247

(22) Filed: Oct. 15, 2013

(65) Prior Publication Data

US 2015/0103304 A1     Apr. 16, 2015

(51) Int. Cl.
*G02C 5/00*     (2006.01)
*G02C 5/14*     (2006.01)
*G02C 1/06*     (2006.01)

(52) U.S. Cl.
CPC ...... *G02C 5/146* (2013.01); *G02C 1/06* (2013.01); *G02C 2200/04* (2013.01); *G02C 2200/08* (2013.01)

(58) Field of Classification Search
CPC .......... G02C 5/00; G02C 5/146; G02C 11/00; G02C 11/02; G02C 2200/08; G02C 2200/22; G02C 2200/26
USPC ............ 2/12, 13, 448; 351/41, 44–49, 51, 52, 351/59, 116, 121, 140, 153
See application file for complete search history.

(56) References Cited

U.S. PATENT DOCUMENTS

| | | | |
|---|---|---|---|
| 3,901,589 A | 8/1975 | Bienenfeld | |
| 3,981,569 A * | 9/1976 | Morgan | G02C 1/06 351/47 |
| 4,045,131 A * | 8/1977 | Sherman | G02C 11/02 351/105 |
| 4,878,749 A | 11/1989 | McGee | |
| 4,950,066 A * | 8/1990 | Hartman | G02C 11/02 351/106 |
| 4,952,043 A | 8/1990 | Werner et al. | |
| 4,958,923 A * | 9/1990 | Rosenson | G02C 5/00 351/106 |
| 5,007,728 A | 4/1991 | Magorien | |
| 5,335,025 A | 8/1994 | Wang | |
| 5,357,292 A | 10/1994 | Wiedner | |
| 5,371,554 A | 12/1994 | Aspesi | |
| 5,652,637 A | 7/1997 | Marini | |
| 6,139,144 A * | 10/2000 | Hynansky | A61F 9/026 351/158 |
| 6,178,561 B1 | 1/2001 | Cheng | |
| 6,186,624 B1 * | 2/2001 | Wang | G02C 5/00 351/140 |
| 6,282,727 B1 * | 9/2001 | Lindahl | A61F 9/025 2/428 |

(Continued)

OTHER PUBLICATIONS

International Search Report and Written Opinion issued in Application No. PCT/US14/60711 dated Mar. 20, 2015.

*Primary Examiner* — Ricky Mack
*Assistant Examiner* — Gary O'Neill
(74) *Attorney, Agent, or Firm* — Parsons Behle & Latimer

(57) ABSTRACT

A modular eyewear with multiple interchangeable components includes: a) a central frame with two eyeglass supporting members, lens and a bridge member; b) lenses, c) at least two temple members, hingedly and removably connected to the central frame at opposite ends thereof; d) two temple quick release mechanisms; e) a lens-free facade member removably attached to the central frame. A user may wear the modular eyewear with or without the facade and with matching, non-matching or substitute temple members.

20 Claims, 7 Drawing Sheets

(56) References Cited

U.S. PATENT DOCUMENTS

| | | |
|---|---|---|
| 6,834,952 B2 | 12/2004 | Polovin |
| 7,059,717 B2 | 6/2006 | Bloch |
| 7,621,633 B1 | 11/2009 | Foster |
| 7,645,039 B2 | 1/2010 | Sheldon |
| 7,744,212 B2 | 6/2010 | Panisset |
| 7,874,668 B2 | 1/2011 | Brousseau et al. |
| 8,028,350 B2 | 10/2011 | Hogen |
| 2004/0001178 A1 | 1/2004 | Shapiro |
| 2004/0160570 A1 | 8/2004 | Polovin |
| 2006/0187404 A1* | 8/2006 | Ifergan ............ G02C 11/02 351/41 |
| 2007/0273823 A1* | 11/2007 | Lee ............ G02C 11/02 351/52 |
| 2008/0086796 A1 | 4/2008 | Lindahl |
| 2013/0003013 A1* | 1/2013 | Collins ............ G02C 5/146 351/116 |
| 2013/0169923 A1* | 7/2013 | Schnoll ............ G02C 5/10 351/153 |

* cited by examiner

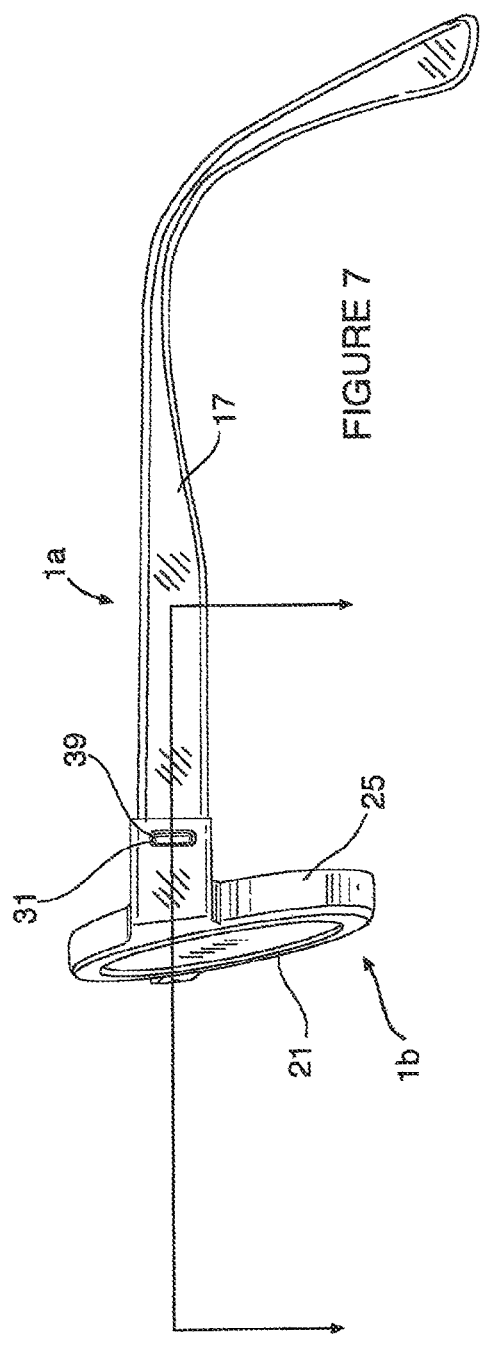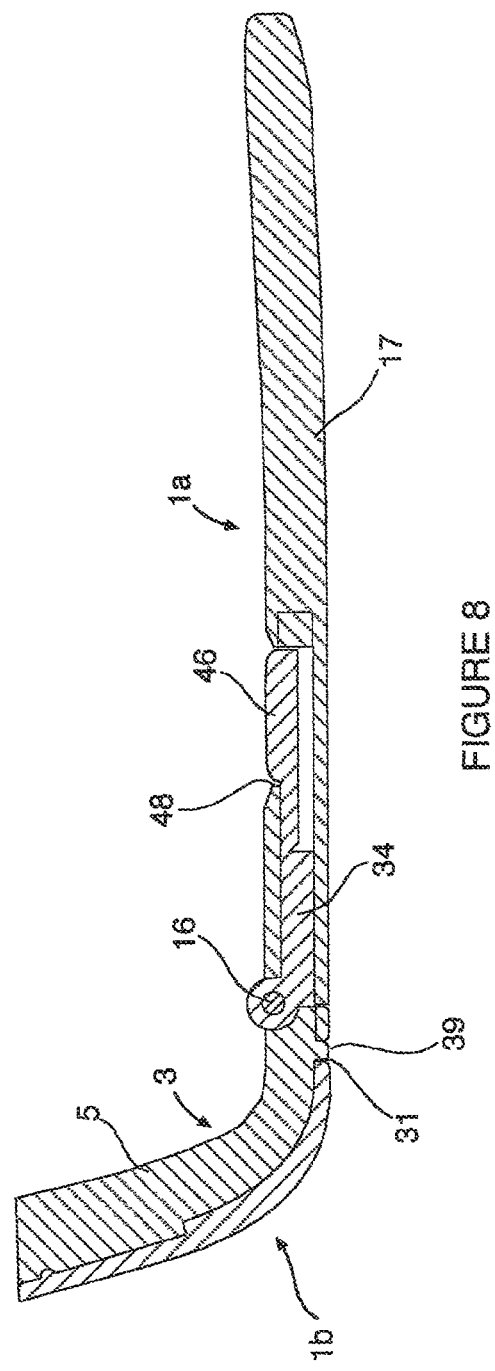

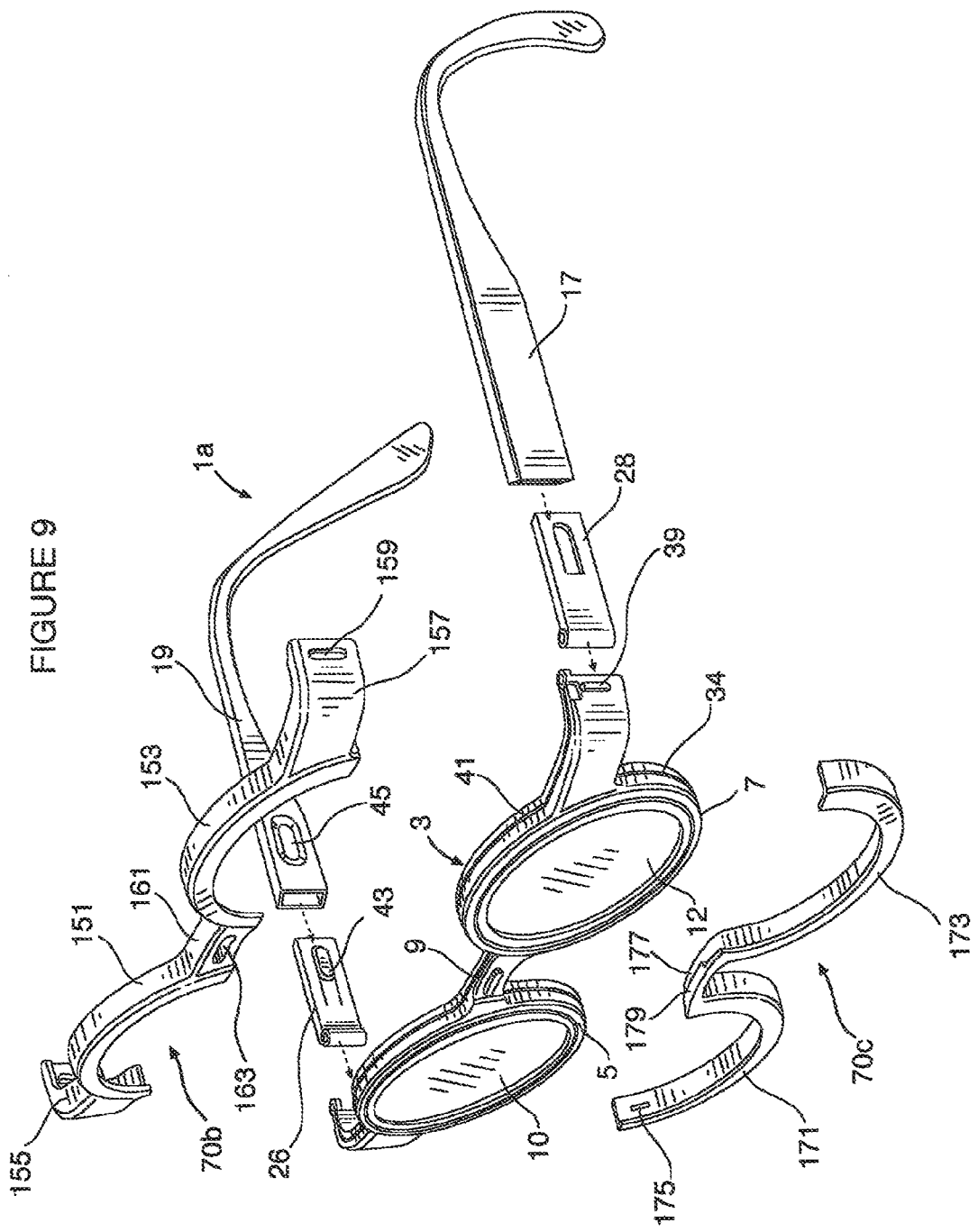

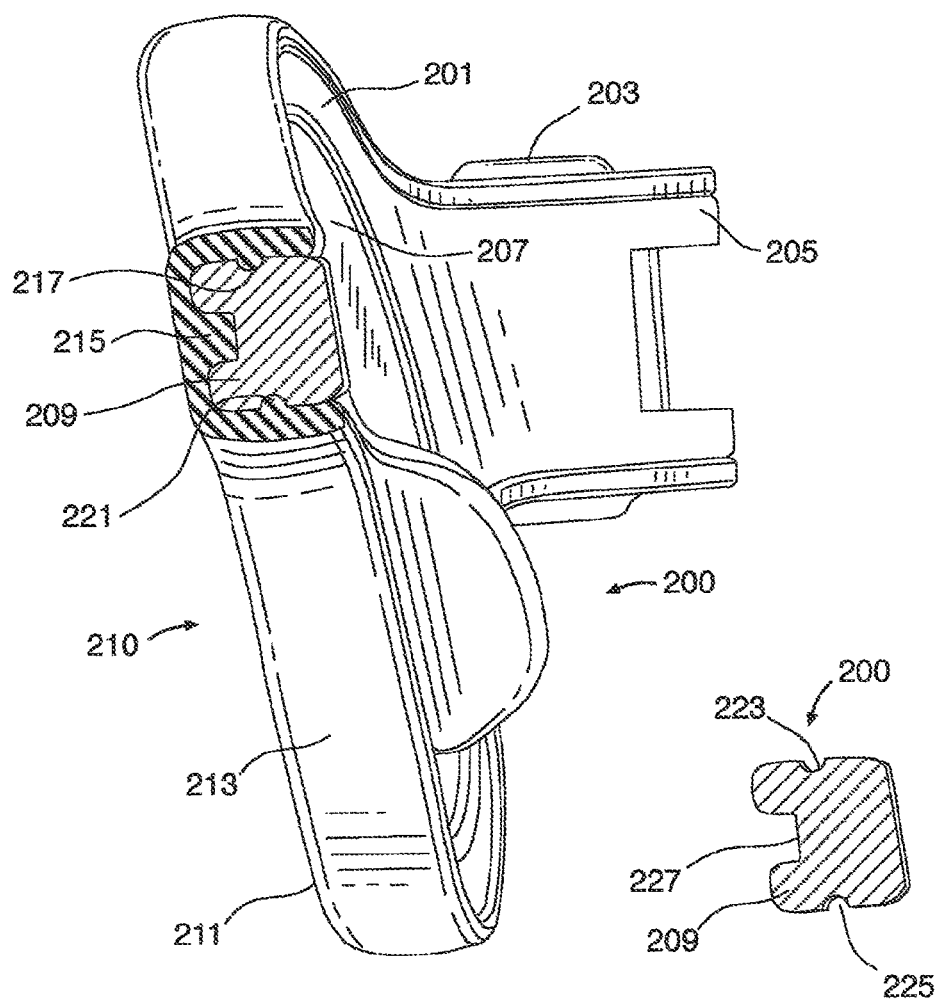

MODULAR EYEGLASSES WITH INTERCHANGEABLE TEMPLES AND FACADES

REFERENCE TO RELATED APPLICATIONS

The present application has no pending applications at the time of filing.

BACKGROUND OF INVENTION a. Field of Invention

The present invention generally relates to glasses worn on the head, namely, eyeglasses, sunglasses, prop glasses, and combinations of these, wherein a user may interchange various selections of temples (temple members are also called earpieces) and, separately, may add, remove or interchange various selections of facades. These facades may cover the front of the main frame, its periphery or both. Thus, a single pair of glasses may have different colors, shapes and styles of temples and may include or exclude facades of different colors shapes and styles. The facades are sections of cover materials that have no lenses and cover part or all of the frames that are revealed from a front and/or a side view. That is, they are generally decorative, but also add strength to and protect the main frame from damage (sunlight, dropping, scratching, etc.). With the present invention, a single pair of subscription or sunglasses can go from conservative office styles to neon colors, to alligator, cloth, polished or shiny metal or leather trim. Thus, the facades and temples may use any colors, shapes and materials of construction that have been used in the glasses industry, as well as others not yet utilized.

b. Description of Related Art

The following patents are representative of the field pertaining to the present invention:

U.S. Pat. No. 8,028,350 B2 to Hogen describes various embodiments of eyewear provided for advantageous use in sports and work, as well as in casual activity. According to one embodiment, an eyeglass can include a frame and an eyecup assembly coupled to the frame. The eyecup assembly can include a resilient side member that has a first proximal portion that is fixed relative to the frame and a second distal portion that is movable relative to the frame and biased toward the frame. The eyecup assembly can also include an adjustment mechanism that is coupled to the resilient side member and positioned at least partially between the resilient side member and the frame. The adjustment mechanism can be selectively operable to flex the resilient side member to move the second distal portion away from the frame and to un-flex the resilient side member to move the second distal portion toward the frame.

U.S. Pat. No. 7,874,668 B2 to Brousseau et al describes an eyeglass frame, the eyeglass frame being usable for supporting a first lens and a second lens, the eyeglass frame comprising: a first rim and a second rim, the first and second rims being provided for supporting respectively the first and second lenses; a bridge attaching the first and second rims to each other; and a nose pad removably attachable to the first rim; the first rim defining a nose pad attachment for removably attaching the nose pad thereto, the nose pad attachment being deformable between a locked configuration in which the nose pad is fixedly attached to the nose pad attachment and an unlocked configuration in which the nose pad is movable relative to the nose pad attachment for selectively attaching the nose pad to the nose pad attachment and detaching the nose pad from the nose pad attachment; the first rim being deformable between a lens supporting configuration in which the first rim is able to support the first lens and a deformed configuration, the deformed configuration being achievable when the first rim is deprived of the first lens; wherein when the first rim is in the lens supporting configuration, the nose pad attachment is in the locked configuration and when the first rim is in the deformed configuration, the nose pad attachment is in the unlocked configuration.

U.S. Pat. No. 7,744,212 B2 to Panisset describes a spectacles consist of an optical or sunshade front optionally supported by a frame and comprising two interchangeable temples. Each temple is connected to the front or to the frame by a male part and an associated joint. In the spectacles, the joint of each temple consists of at least one pin arranged transversely in a corresponding longitudinal slot formed at one end of a free temple. The pin can be snapped into an elastically deformable recess formed in a plate projecting from the male part, the shape and dimensions of which are approximately the same as those of the slot of the temple, or vice versa.

U.S. Pat. No. 7,645,039 B2 to Sheldon describes an eyewear is provided having an interchangeable lens or temple portion. The eyewear comprises an interchangeable lens portion comprising a lens portion having an upper and a lower edge, and a left and a right lens region extending sidewardly each having a distal end; a pair of connecting members, each having a proximate end and a distal end and a hollow receiving area therein beginning at the proximate end and running into the connecting member; the distal end of the lens regions being shaped to fit within the proximate end of the connecting members wherein, the lens regions are releasably accepted and held within the hollow receiving area of the connecting members; and wherein the connecting members are releasable from the lens portion by applying a torsional force on one of the connecting member and the lens portion.

U.S. Pat. No. 7,621,633 B1 to Foster describes a modular eyeglass frame that includes a lens frame and a plurality of handles with oppositely facing first and second sides. Each side may include unique surface indicia. A mechanism for interchangeably connecting the handles to the lens frame may further be included. A coupling may be attached to a proximal end of one of the handles. Helical spring members may be mated to the coupling at one end and may include a bearing at another end. Receiving blocks may be attached to the lateral ends of the lens frame and may feature sockets formed in an inner wall thereof, to receive each bearing. Grooves may be formed in lateral sides of the receiving blocks. Such grooves may be effectively axially aligned with locking arms such that the locking arms are interfitted inside the grooves when the coupling is interfitted between the receiving blocks.

U.S. Pat. No. 7,059,717 B2 to Bloch describes an eyeglasses apparatus and transformation system thereof, facilitating quick and easy convertibility of the left and right traditionally folding temples into an adjustable headband; thereby making the light-weight eyeglasses much more suited to dynamic activities such as jogging, skiing, and cycling for example. The user of this eyewear can advantageously move between more sedentary situations, where the extreme appearance of eye-goggles would appear very out of place;—yet by manually releasing an inconspicuously integrated pair of bifurcated retention-latches located immediately aftward of both temple-hinges, the temples can be instantly detached and readily interchanged with a headband employing similar slide-in bayonet-type retention-latches. The disclosure identifies a particularly critical human-factors problem addressed by the uniquely configured finger operated opposed latches; plus, the notion of my slim-lined detachable-temples, enables a host of optional companion accessory temple embodiments, facilitating a miniature radio, cell-phone, or digital-camera;—conveniences for the person on the go!

U.S. Pat. No. 6,834,952 B2 to Polovin describes a pair of glasses that includes a lens frame supporting a pair of lenses. The frame includes rearwardly extending temple mountings to which there is releasably attached temples. The temples are releasably attach to the mountings by means of clip assemblies.

U.S. Pat. No. 6,178,561 B1 to Cheng describes safety goggles that include a primary frame having a top provided with two raised seats and an upwardly extending tongue between the two raised seats, each of the seats having a first pin extending outwardly longitudinally from an end thereof and a second pin extending outwardly longitudinally from another end thereof, a lens frame having a top provided with two cavities aligned with the two raised seats, each of the cavities being formed with a groove and an opening configured to receive the first pin and the second pin respectively, a recess being formed between the two cavities and aligned with the tongue, the recess having an inclined surface at an outer side thereof and a chamfer at an inner side thereof, the chamfer being located close to the opening, whereby the goggles can be rapidly manufactured and assembled.

U.S. Pat. No. 5,357,292 to Wiedner describes glasses, in particular industrial safety or sports glasses, with an integral continuous sight piece and with inclination-adjustable side pieces articulated on a frame piece it is provided for the purpose of defined and reliable inclination-adjustment accompanied by the advantage of low-cost manufacturing that the sight piece has lateral backwards oriented appendixes formed in one piece with it and extending about in parallel to the wearer's head, that a frame piece with lateral appendixes is arranged along the upper edge of the sight piece surrounding the latter and the latter's appendixes, that the frame piece with the articulated side pieces is supported on the sight piece pivotably around a horizontal pivot axis, in that pins are arranged on the inside of each of the appendixes, that the pins engage with semicircular slits concentric of the pivot axis in the appendixes of the sight piece, wherein, to arrest the pins in certain angular positions of the slits, the latter are formed by a plurality of approximately annular locking recesses intersecting to form locking protrusions and approximately corresponding to the cross-section of the pin.

U.S. Pat. No. 5,335,025 to Wang describes a sunshade and sunglasses which may be interchangeably detachably attached to vision correcting eye glasses is provided. The attachment being by means of flexi-grip-catch pairs. A pair of flexi-grips are integrally formed on the top of an eyeglass frame for correcting lenses and are adapted for being received by a first pair of catches that are integrally formed on the top of a frame of a pair of sunglasses which has no temples, or a second pair of catches fixedly positioned underneath a sunshade. The positions of the respective first and second pairs of catches are in alignment with the position of the flexi-grips. By pressing the first pair of catches onto the respective flexi-grips, the sunglass lenses are pivotally attached thereon.

U.S. Pat. No. 5,007,728 to Magorien describes a detachable two-piece temple having a front piece swivelly attached to the back of an eyeglass frame and a back piece that is quickly, easily and securely attached and detached from the front piece. The front piece has extending from its rear surface a resilient locking rod, that includes a lock notch, and a guide rod. The back piece includes a locking rod cavity sized to accept and retain the rod, a guide rod cavity that is sized to accept and retain the rod, and a locking-rod release opening that has a lock notch catch. When the back piece is inserted into the front piece, the locking rod and guide rod enter their respective cavities. When fully entered, the lock notch slips upwardly into the lock notch catch to securely hold the two pieces together. To release the two pieces, the lock notch is depressed while the back piece is pulled away from the front piece. The temple can be used to enhance fashion glasses by allowing temples of various colors and patterns to be used with eyeglass frames. The temple may also be designed to serve as safety glasses by attaching to the front and back pieces, a top safety shield and a side safety shield that prevent foreign objects from entering the area of the eyes.

U.S. Pat. No. 4,952,043 to Werner et al describes a sun shade is provided for a pair of glasses including right and left hand panel structures for disposition immediately forward of the right and left hand lenses of the glasses and the panel structures are guidingly supported relative to each other for movement toward and away from each other. Biasing means is connected between the panel sections for biasing the latter toward each other and remote portions of the panel structure include upstanding, tensioned elastic members which may have their vertical mid-portions deflected apart by the temples of the associated glasses rearward of the pivot axes thereof and the upper margins of the panel sections include rearwardly projecting support flange sections for overlying the right and left hand portions of the associated glasses. The support flange sections support the weight of the sun shade from the glasses and the elastic members enjoy a non-slip frictional engagement with the glasses temples to not only prevent forward displacement of the sun shade relative to the glasses but to also exert inward biasing forces on the glasses temples rearward of the pivot axes thereof such that the grip of the temples on the head of the wearer of the glasses is increased to compensate for the additional weight of the sun shade supported from the glasses.

U.S. Pat. No. 4,878,749 to McGee describes a protective eyewear which may be tinted for use as sunglasses having a preformed one piece lens arrangement with a recessed border and removable temples hinged to the preformed lens. The removable temple pieces have posts which fit sockets at opposite upper and lower ends of the preformed lens. Interchangeable decorative frames allow the wearer to change the appearance of the protective eyewear at will. The interchangeable decorative frames have pins which snap into the sockets used for the hinges for the temple pieces allowing the frame to be easily removed and replaced with a different color or design decorative frame.

U.S. Pat. No. 3,901,589 to Bienenfeld describes a clip-on flip-up goggles of novel construction are provided wherein a simply constructed inexpensive shield holder and clipping means permit manual adjustment of the shield to any one of five positions for use or storage out of use while still secured to the frame of a pair of spectacles. Also, a simple shield holder is provided for detachably securing the shield so it can be easily interchanged with other shields. Also, an easily fabricated and assembled clipping means is provided.

SUMMARY OF INVENTION

The present invention is modular eyewear with multiple interchangeable components. This modular eyewear includes: a central frame with two eyeglass supporting members; an eyeglass located in each of the two eyeglass supporting members; at least two removable interchangeable temples attached to the frame; quick releases for removing and attaching temples to the frame; and a lens-free façade attached to the central frame. The central frame has a front, a back and peripheral sides, and has at least two eyeglass supporting members for support two eyeglasses, and has a bridge member symmetrically positioned between and connecting the two eyeglass supporting members, for resting directly or indirectly on the nose of a user (indirectly, for example, would be a bridge member with stick on pads). As mentioned, an eyeglass is located in each of two eyeglass supporting members, and the eyeglass is selected from the group consisting of non-prescription glass, prescription glass, non-prescription plastic, prescription plastic and combinations thereof. Any of these may or may not be safety glasses. There are at least two temple members, hingedly and removably connected to the central frame at opposite ends thereof. Preferably, there is one temple member on each side (left and right temples), but in some embodiments they could be further broken down into additional interchangeable sections. Two quick release mechanisms are connected to the frame at opposite ends thereof and each connected to one of the temple members, so as to permit quick release of each of at least a portion of the temple member for interchangeability with other mechanically similar, different temple members. The facade member is removably attached to the central frame and covering at least a portion of the central frame, the facade presenting at least one alternative feature selected from color, shape, texture and reflectivity. The facade is lens-free, and the facade has facade attachment means for attachment to the frame. With this invention, a user may wear the modular eyewear with or without a facade and with matching, non-matching or substitute temple members.

In some preferred embodiments of the present invention modular eyewear with multiple interchangeable components, the facade member includes facade attachment means for snap-on and snap-off attachment to and from the frame.

In some preferred embodiments of the present invention modular eyewear with multiple interchangeable components, the facade attachment means is selected from the group consisting of catches, snaps, rail snaps and slides.

In some preferred embodiments of the present invention modular eyewear with multiple interchangeable components, the facade member is a frontal facade member having front portions that cover at least a portion of the front of the frame.

In some preferred embodiments of the present invention modular eyewear with multiple interchangeable components, the facade member is a peripheral side facade member having perimeter portions that cover at least a portion of the peripheral sides of the frame.

In some preferred embodiments of the present invention modular eyewear with multiple interchangeable components, the facade member is a compound facade member having front portions that cover at least a portion of the front of the frame posts and having perimeter portions that cover at least a portion of the peripheral sides of the frame.

In some preferred embodiments of the present invention modular eyewear with multiple interchangeable components, the facade member is an upper half facade member that covers at least a portion of only an upper half of the frame.

In some preferred embodiments of the present invention modular eyewear with multiple interchangeable components, the facade member is a lower half facade member that covers at least a portion of only a lower half of the frame.

In some preferred embodiments of the present invention modular eyewear with multiple interchangeable components, the two quick release mechanisms are selected from the group consisting of snaps, slides, clips, tracks, catches and combinations thereof.

In some preferred embodiments of the present invention modular eyewear with multiple interchangeable components, the frame contains two hinges and two hinged extensions, one each hinge and a hinged extension connected at opposite ends of the frame, the hinged extensions being receivers for each of the temple members and having a quick release mechanism component located on each of the hinged extensions and complementary quick release mechanism component located on each of the temple members. In some of these embodiments, the quick release mechanism is a push button catch mechanism. In some of these embodiments, a push button and a catch are located on each of the frame members and a receiver and button hole are located on the hinged extensions.

In some preferred embodiments of the present invention modular eyewear with multiple interchangeable components, the quick release mechanism is a push button/catch mechanism. In some of these embodiments, a push button and a catch are located on each of the frame members and a receiver and a push button hole are located on the frame. In some cases, each of the button hole and the push button face away from its opposing button hole and push button so as to be exposed when worn, while in other cases, each of the button hole and the push button face toward its opposing button hole and push button so as to be concealed when worn.

In some preferred embodiments of the present invention modular eyewear with multiple interchangeable components, the modular eyewear is modular sunglasses eyewear and the eyeglass includes a sun filtering element.

In some preferred embodiments of the present invention modular eyewear with multiple interchangeable components, the frame and the temple members are molded plastic.

In some preferred embodiments of the present invention modular eyewear with multiple interchangeable components, the facade member is molded plastic selected from the group consisting of rigid plastic and semi-rigid plastic.

In some preferred embodiments of the present invention modular eyewear with multiple interchangeable components, at least one of the facade member and the temple members contain a three dimensional representation selected from the group consisting of a logo design, alphabet characters, a signature, and a character representation.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings:

FIG. 7 is a side view of the embodiment of a present invention modular eyewear with multiple interchangeable components showing interchangeable temples and a full coverage facade of FIG. 1, with a cut line, and FIG. 8 is a partial cut top view thereof along the cut line;

FIG. 9 is an oblique view of another embodiment of a present invention modular eyewear with multiple interchangeable components showing interchangeable temples and a full coverage facade, utilizing the frame and temple components of FIG. 1, but showing separate upper and lower facades with full coverage (frontal plus peripheral coverage);

FIG. 12 shows a side cut view of one preferred embodiment of a present invention modular eyewear that is cut through the bridge and across a temple; and FIG. 13 shows an outline of the cut bridge of FIG. 12. Collectively, they show one preferred arrangement for the facade attachment and central location and alignment features.

DETAILED DESCRIPTION OF THE EMBODIMENTS

The present invention modular eyewear enables incredible diversity for eyewear users by offering unlimited possibilities for interchangeable temples and interchangeable facades using a single set of lenses and central frame. Adults can have fancy dress glasses, casual glasses, bright color glasses, leather, metal and cloth designs, as well, for a small fraction of the cost of multiple pairs of prescription glasses. Children who may have been shy or self-conscious of wearing glasses will now look forward to making fashion selections each day, even color-coordinating with their clothes.

Figure 1:
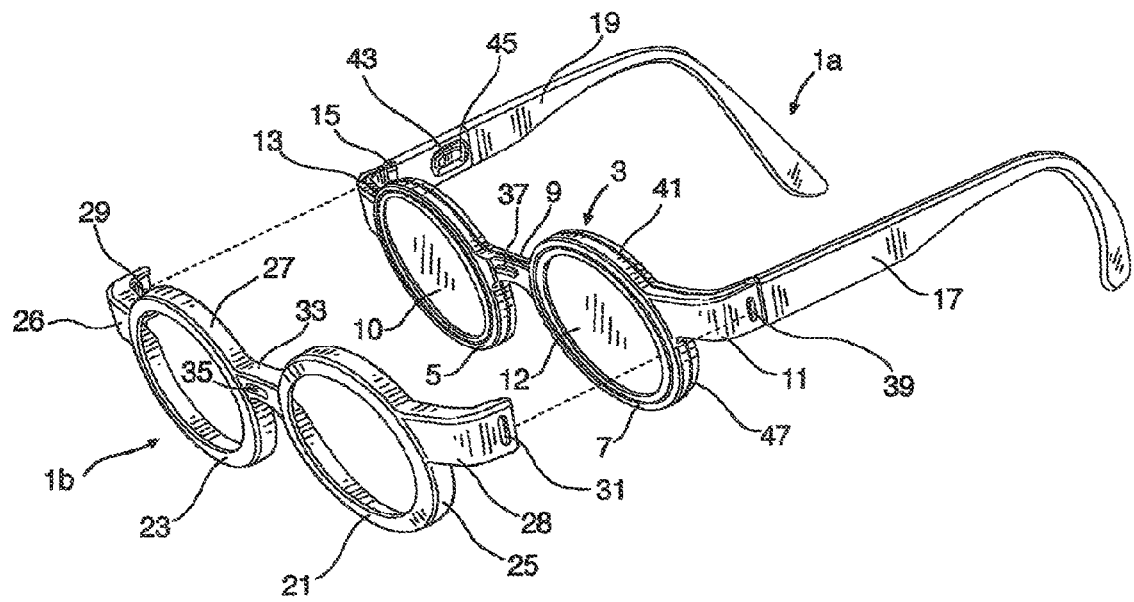
FIG. 1 is an oblique view of an embodiment of a present invention modular eyewear with multiple interchangeable components showing interchangeable temples and a full coverage facade.

FIG. 1 is an oblique view of an embodiment of a present invention modular eyewear that includes a central frame with temples shown generally as eyewear 1a and a full coverage facade 1b. The central frame 3 has eyeglass supporting members 5 and 7, containing eyeglass 10 and eyeglass 12, respectively. The term "eyeglass" as used herein, means any lens described above or below made of any lens material available. Central frame 3 also has a bridge member 9, which includes a central locator protrusion 37. In this case, the central locator on frame 3 is a protrusion that corresponds to a recess or orifice 35 on facade 1b, but, alternatively, the recess or orifice could be on the frame with a corresponding protrusion on the facade. Central frame 3 further includes ends 11 and 13. In this embodiment, ends 11 and 13 are opposing corners that include hinges, such as hinge 15, as well as facade attachment locks such as facade lock 39 (protrusion). The hinges will connect with extensions (shown in detail in FIGS. 8 and 9 below) that are functional aspects of the invention for receiving temples 17 and 19. Thus, button 43 is a catch/button mechanism attached to the extension (not shown) and protruding from orifice 45 of temple 19. There is symmetrically opposite hidden button on the inside of temple 17 as well. By pressing these buttons (such as button 43) and sliding the temples (such as temple 19) away from central frame 3, the temples 17 and 19 may be removed and replaced with functionally similar temples of different designs, shapes, colors or other unique features.

Facade 1b has a bridge section 33 with alignment orifice 35 and full eyeglass support member covers 21 and 23 with both frontal cover portions and peripheral cover portions 25 and 27. Opposing end pieces 26 and 28 include lock orifices 29 and 31. These are attached to central frame locks such as lock 39. Additionally, central frame 3 has front and peripheral track guides (recessed here, but could be protruding tracks) such as upper peripheral track guide 41 and lower peripheral track guide 47. Corresponding tracks are included inside facade 1b to fit into the central frame guides. These are shown in detail in FIG. 2.

Figure 2:
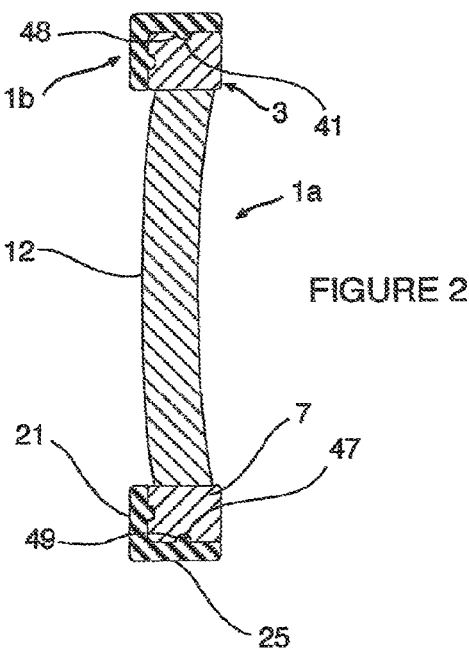
FIG. 2 is a partial side cut view of the embodiment of a present invention modular eyewear with multiple interchangeable components of FIG. 1 showing the fitting of the full coverage facade on the central frame.

FIG. 2 is a partial side cut view of the embodiment of a present invention modular eyewear with multiple interchangeable components of FIG. 1 showing the fitting of the full coverage facade 1b on the central frame 3. It shows a section of eyeglass 12 and eyeglass supporting member 7. Eyeglass support member cover 21 of facade 1b includes frontal and peripheral tracks (protrusions, such as track 48 positioned in track guide 41 and track 49 positioned in track 47.). As now can be seen, the tracks and track guides maintain a fixed position for the facade 1b on central frame 3. A user may select a facade from different shapes, colors, textures, etc. and snap them on and off and interchange them as desired.

Figure 3:
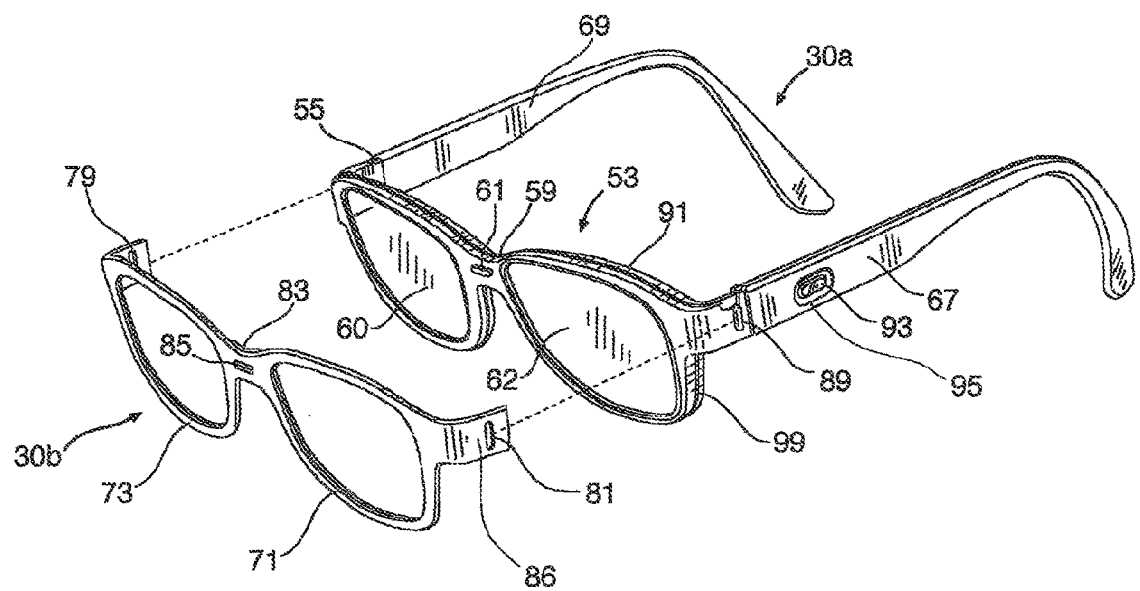
FIG. 3 is an oblique view of another embodiment of a present invention modular eyewear with multiple interchangeable components showing interchangeable temples and a frontal coverage facade.

FIG. 3 is an oblique view of another embodiment of a present invention modular eyewear 30a and a frontal coverage facade 30b. The central frame 53 has eyeglass supporting members, such as eyeglass supporting member 99, containing eyeglass 10 and eyeglass 12, as shown, and has track guides similar to those of central frame 3 in FIG. 1. Central frame 53 also has a bridge member 59, which includes a central locator protrusion 61. In this case, the central locator on frame 53 is a protrusion that corresponds to an orifice 85 on facade 30b, but, they could be reversed, i.e. switched positions and still function within the scope of the present invention. Central frame 53 further includes opposing corners that include hinges, such as hinge 55, as well as facade attachment locks such as facade lock 89 (protrusion). The hinges will connect with extensions (similar to the ones shown in detail in FIGS. 8 and 9 below, but with externally oriented buttons instead on internally oriented buttons). These hidden extensions are functional aspects of the invention for receiving temples 67 and 69. Button 93, one of two opposing buttons facing away from each other) is a catch/button mechanism attached to the extension (not shown) and protrudes from orifice 95 of temple 67. By pressing this buttons (such as button 93) and sliding the temples 67 and 69 away from central frame 53, the temples 67 and 69 may be removed and replaced with functionally similar temples of different designs, shapes, colors or other unique features.

Facade 30b has a bridge section 83 with alignment orifice 35 and has frontal eyeglass support member covers 71 and 73. (Note that in this embodiment, there are no peripheral cover portions as in FIGS. 1 and 2.) Partial or design peripheral portions could be included as well, e.g., peripheral colorful wave or sinusoidal designs. Opposing end pieces, such as corner 86, include lock orifices 79 and 81. These are attached to central frame locks such as lock 89 described above. Additionally, central frame 53 has front and peripheral track guides (recessed here, but could be protruding tracks) such as track guides 91 and 99. Corresponding frontal tracks are preferably included inside facade 30*b* to fit into and attach to the central frame guides. These are shown in detail in FIG. 4.

Figure 4:
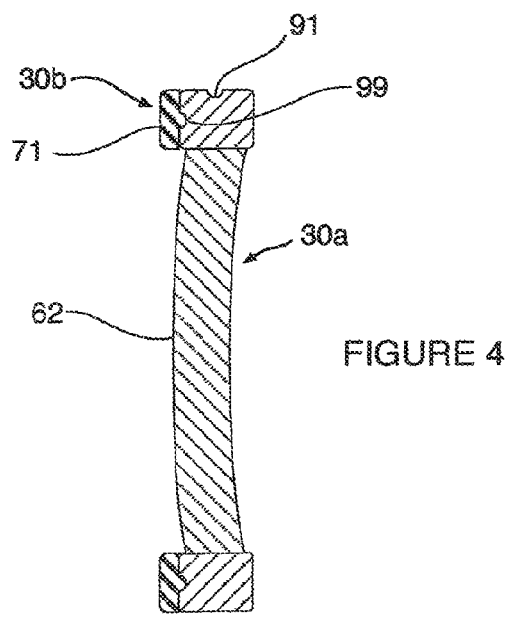
FIG. 4 is a partial side cut view of the embodiment of a present invention modular eyewear with multiple interchangeable components of FIG. 3 showing the fitting of the frontal coverage facade on the central frame.

FIG. 4 is a partial side cut view of the embodiment of a present invention modular eyewear with multiple interchangeable components of FIG. 3 showing the fitting of the frontal coverage facade 30*b* on the central frame 53. It shows a section of eyeglass 62 and the corresponding eyeglass supporting member of frame 53. Frontal eyeglass support member cover 71 of facade 30*b* includes frontal tracks and attaches to frame 53. As now can be seen, the tracks and track guides maintain a fixed, secured position for the facade 30*b* on central frame 53. A user may select a facade from different shapes, colors, textures, etc. and snap them on and off and interchange them as desired.

Figure 5:
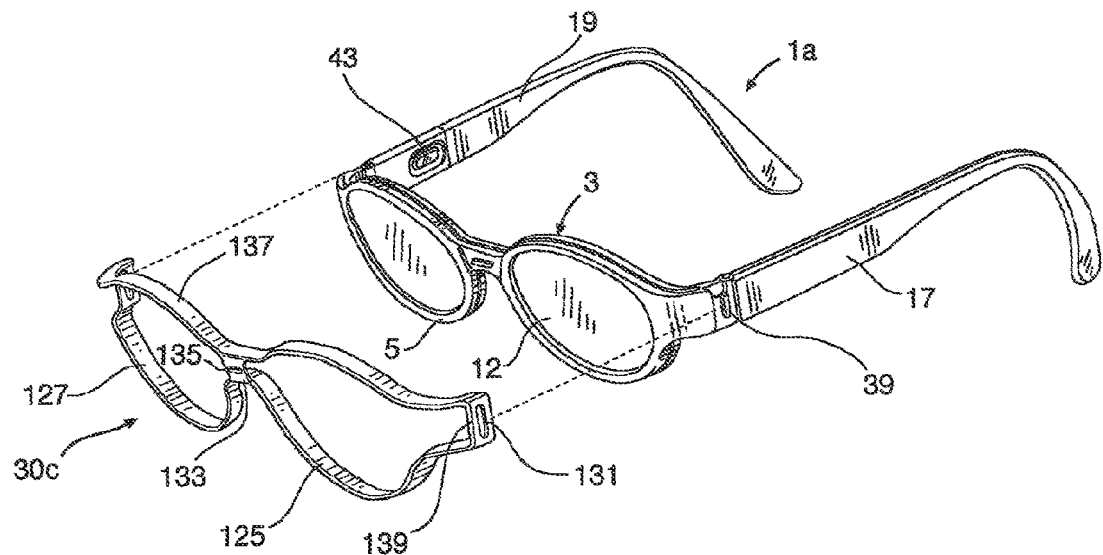
FIG. 5 is an oblique view of another embodiment of a present invention modular eyewear with multiple interchangeable components showing interchangeable temples and a peripheral coverage facade.

FIG. 5 is an oblique view of another embodiment of a present invention modular eyewear 1*a* and a peripheral coverage facade 30*b*. (Because the eyewear 1*a* is the same component as eyewear 1*a* in FIG. 1, it should be noted that here, as well as elsewhere in this document, identical numbers in the drawings are referencing identical parts and as these parts are repeated in subsequent drawings, need not be repeated and called out for each occurrence.)

Facade 30*c* has a bridge section 133 with alignment orifice 135 and has peripheral eyeglass support member peripheral covers 125 and 127, including tops, such as top 137. Partial or design frontal portions could be included as well, e.g., frontal (hanging) triangles or leaf sections. Opposing end pieces, such as corner 139, include lock orifices, such as lock orifice 131. These are attached to central frame locks such as lock 39 described above. Additionally, central frame 53 has front and peripheral track guides (recessed here, but could be protruding tracks) such as track guides 91 and 99. Corresponding peripheral tracks (not shown) may be included inside facade 30*c* to fit into and attach to the central frame guides. These are shown in the blown up detail in FIG. 6.

Figure 6:
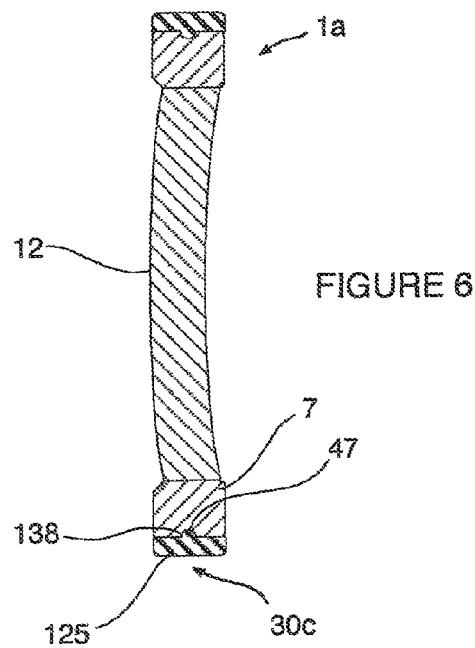
FIG. 6 is a partial side cut view of the embodiment of a present invention modular eyewear with multiple interchangeable components of FIG. 5 showing the fitting of the peripheral coverage facade on the central frame.

FIG. 6 is a partial side cut view of the embodiment of a present invention modular eyewear with multiple interchangeable components of FIG. 5 showing the fitting of the peripheral coverage facade 30*c* on the central frame 3. It shows a section of eyeglass 12 and eyeglass supporting member 7. Eyeglass support member peripheral cover 125 of facade 30*c* includes peripheral tracks (protrusions, such as track 138 positioned in track guide 47). As now can be seen, the tracks and track guides maintain a fixed position for the facade 30*c* on central frame 3. A user may select a facade from different shapes, colors, textures, etc. and snap them on and off and interchange them as desired.

FIG. 7 is a side view of the embodiment of a present invention modular eyewear with multiple interchangeable components showing interchangeable temples such as temple 17 and a full coverage facade of FIG. 1, with a cut line, and FIG. 8 is a partial cut top view thereof along the cut line of FIG. 7; FIG. 7, as mentioned is a side view of the present invention modular eyewear shown in FIG. 1, but fully assembled. FIG. 8 illustrates a frontal portion of facade 1*b* with lock orifice 31 snapped onto lock 39 of central frame 3. Extension piece 34 attached to hinge 16 with catch/button 46 positioned in button orifice 48. Temple 17 has been slid onto extension 34, causing button 46 to pop into surface 48, thus locking temple 17 into the extension 34 until button 46 is pressed and temple 17 is removed there from for subsequent interchangeability with other styles, shapes and/or color temples.

FIG. 9 is an oblique view of another embodiment of a present invention modular eyewear with multiple interchangeable components showing interchangeable temples and full coverage half height facade, utilizing the frame and temple components of FIG. 1, namely eyewear 1*a*, but showing separate upper and lower facades 70*b* and 70*c*, respectively, with full coverage, i.e., frontal plus peripheral coverage. In this Figure, more details of the eyewear 1*a* of FIG. 1 are revealed. Extension 28 has a half shell hinge receiver to its forward area and a recessed area with a catch button, similar to button 43 on extension 26. It should be understood that in some embodiments, the temples 17 and 19 are in multiple pieces or sections snapped together or otherwise connected to provide a geometrically increased number of interchangeability possibilities. For example, if temple 17 is two pieces connected to one another and each has seven color possibilities, then there may be over 45 color combinations.

Upper facade 70*b* has a bridge 161, left and right top cover sections 151 and 153, and ends, such as end 157, with lock orifices, such as lock orifice 159. Bridge 161 has a central alignment orifice 163. This may be attached in the same manner as facade 1*b* discussed above.

Lower facade 70*c* has a bridge 177, left and right bottom cover sections 171 and 173, and ends with lock tracks, such as track 175. Alternatively, eyewear bridge 9 could have two alignment locator protrusions, one above the other and one for the upper and one for the lower facades 70*b* and 70*c*, in which case lower facade bridge 177 could have and alignment orifice.

Figure 10:
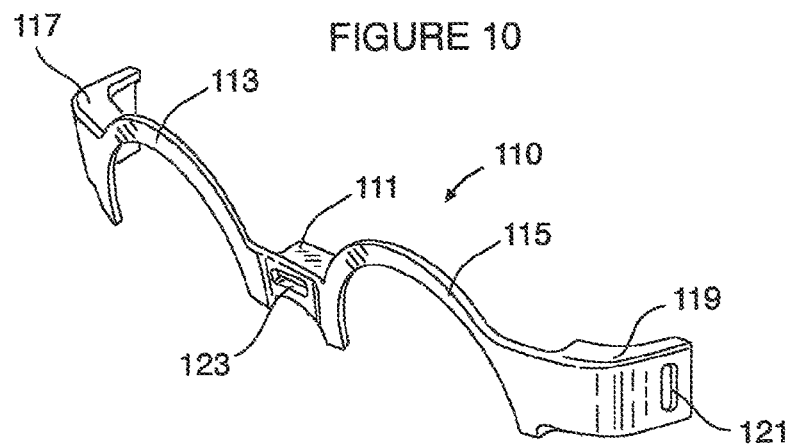
FIG. 10 shows an oblique view of a component of another embodiment of a present invention modular eyewear with multiple interchangeable components, showing an upper frontal coverage facade (upper half facade); and, FIG. 11 shows an oblique view of a component of another embodiment of a present invention modular eyewear with multiple interchangeable components, showing a lower peripheral coverage facade (lower half facade)

FIG. 10 shows an oblique view of a component of another embodiment of a component of the present invention modular eyewear with multiple interchangeable components, showing an upper frontal coverage facade 110. It has a bridge 111, left and right top frontal cover sections 113 and 115, and ends 117 and 119, with lock orifices, such as lock orifice 121. Bridge 111 has a central alignment locator orifice 123. This may be attached in the same manner as facade 1*b* discussed above to any eyewear the same as or similar to eyewear 1*a* above.

Figure 11:
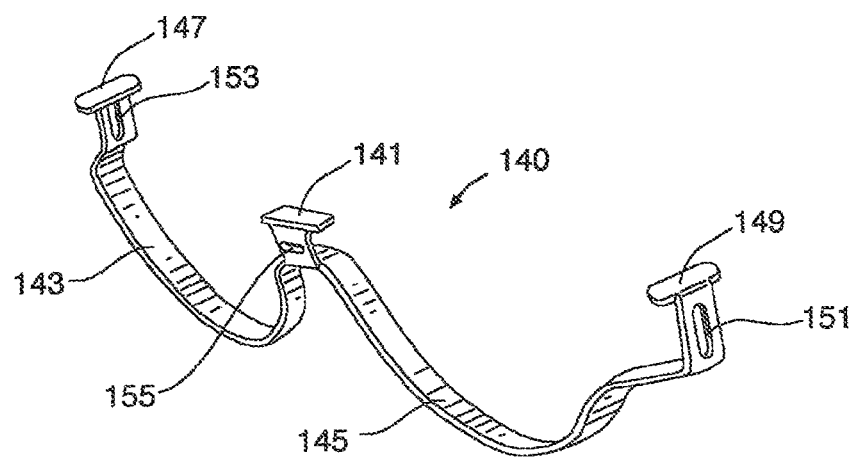

FIG. 11 shows an oblique view of a component of another embodiment of a present invention modular eyewear with multiple interchangeable components, showing a lower peripheral coverage facade 140. It has a bridge 141, left and right bottom peripheral cover sections 143 and 145, and ends 147 and 149, with lock orifices 151 and 153. Bridge 141 has a central alignment locator orifice 155. This may be attached in the same manner as facade *b* discussed above to any eyewear the same as or similar to eyewear 1*a* above.

FIG. 12 shows a side cut view of one preferred embodiment of a present invention modular eyewear 200 that is cut through the bridge 209 and across a temple 205. The central frame 203 has two eyepieces but one is cut out of the figure and one is shown, namely, the right eyepiece, that is, eyeglass supporting member 201 and eyeglass 207. This central frame 203 cut bridge 203 is shown in profile in FIG. 13 to more fully illustrate attachment mechanism details. They are the location/positioning (alignment) recess 227 and peripheral recesses 223 and 225. Referring back to FIG. 12 and in conjunction with FIG. 13, they collectively show one preferred arrangement for the facade attachment and central location and alignment features. Thus, facade 210 includes the full coverage (peripheral and frontal) and has a frontal cover portion 211 and a peripheral cover portion 213. It also has a bridge covering 221 that has a top, a bottom and a front section with an open back, so as to slip onto bridge 209, as shown. It has central locator protrusion 215 that fits into bridge recess 227, and protrusions 217 and 219 that pop into bridge recesses 223 and 225. These, along with other attachment points (not shown but such as are described above) present an efficient, easy to attach, well attached connection between the facade 210 and the frame 203.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims. For example, some of the attachment channels or rails or other mechanisms may be partial, rather than full length or may be at multiple points rather than continuous.

What is claimed is:

1. A modular eyewear with multiple interchangeable components, comprising:
   a) a central frame having at least two eyeglass supporting members and a bridge member symmetrically positioned between and connecting said two eyeglass supporting members, said central frame having a front and a back and having peripheral sides, and frame ends having side portions extending backward from opposing lateral sides of the central frame, the side portion of each frame end having a facade attachment lock;
   b) an eyeglass located in each of said two eyeglass supporting members, said eyeglass being selected from the group consisting of non-prescription glass, prescription glass, non-prescription plastic, prescription plastic and combinations thereof;
   c) at least two temple members, hingedly and removably connected to said central frame at the frame ends, each temple member having an outer side surface;
   d) two quick release mechanisms connected to said frame at opposite ends thereof and each connected to one of said temple members, so as to permit quick release of each of at least a portion of said temple member for interchangeability with other mechanically similar, different temple members;
   e) a facade member removably attached to said central frame, having opposing lateral sides and façade ends extending backward from the opposing lateral sides of the façade member, the façade member covering at least a portion of said central frame, the façade ends covering at least a portion of and the frame ends and engaging the façade attachment lock at each frame end, each façade end having an outer side surface that is substantially coplanar with the outer side surface of the corresponding temple member, said facade presenting at least one alternative feature selected from color, shape, texture and reflectivity, said facade being lens-free, and said facade having facade attachment means for attachment to said frame;
   wherein a user may wear said modular eyewear with or without said facade and with matching, non-matching or substitute temple members.

2. The modular eyewear with multiple interchangeable components of claim 1 wherein said facade member includes facade attachment means for snap-on and snap-off attachment to and from said frame.

3. The modular eyewear with multiple interchangeable components of claim 1 wherein said facade attachment means is selected from the group consisting of catches, snaps, rail snaps and slides.

4. The modular eyewear with multiple interchangeable components of claim 1 wherein said facade member is a frontal facade member having front portions that cover at least a portion of said front of said frame.

5. The modular eyewear with multiple interchangeable components of claim 1 wherein said facade member is a peripheral side facade member having perimeter portions that cover at least a portion of said peripheral sides of said frame.

6. The modular eyewear with multiple interchangeable components of claim 1 wherein said facade member is a compound facade member having front portions that cover at least a portion of said front of said frame and having perimeter portions that cover at least a portion of said peripheral sides of said frame.

7. The modular eyewear with multiple interchangeable components of claim 1 wherein said facade member is an upper half facade member that covers at least a portion of only an upper half of said frame.

8. The modular eyewear with multiple interchangeable components of claim 1 wherein said facade member is a lower half facade member that covers at least a portion of only a lower half of said frame.

9. The modular eyewear with multiple interchangeable components of claim 1 wherein said two quick release mechanisms are selected from the group consisting of snaps, slides, clips, tracks, catches and combinations thereof.

10. The modular eyewear with multiple interchangeable components of claim 1 wherein said frame contains two hinges and two hinged extensions, one each hinge and a hinged extension connected at opposite ends of said frame, said hinged extensions being receivers for each of said temple members and having a quick release mechanism component located on each of said hinged extensions and complementary quick release mechanism component located on each of said temple members.

11. The modular eyewear with multiple interchangeable components of claim 1 wherein said quick release mechanism is a push button catch mechanism.

12. The modular eyewear with multiple interchangeable components of claim 11 wherein a push button and a catch are located on each of said frame members and a receiver and button hole are located on said frame.

13. The modular eyewear with multiple interchangeable components of claim 10 wherein said quick release mechanism is a push button catch mechanism.

14. The modular eyewear with multiple interchangeable components of claim 13 wherein a push button and a catch are located on each of said frame members and a receiver and button bole are located on said hinged extensions.

15. The modular eyewear with multiple interchangeable components of claim 14 wherein each of said button hole and said push button face away from its opposing button hole and push button so as to be exposed when worn.

16. The modular eyewear with multiple interchangeable components of claim 14 wherein each of said button hole and said push button face toward its opposing button hole and push button so as to be concealed when worn.

17. The modular eyewear with multiple interchangeable components of claim 1 wherein said modular eyewear is modular sunglasses eyewear and said eyeglass includes a sun filtering element.

18. The modular eyewear with multiple interchangeable components of claim 1 wherein said frame and said temple members are molded plastic.

19. The modular eyewear with multiple interchangeable of claim 1 wherein said facade member is molded plastic selected from the group consisting of rigid plastic and semi-rigid plastic.

20. The modular eyewear with multiple interchangeable components of claim 1 wherein at least one of said facade member and said temple members contain a three dimensional representation selected from the group consisting of a logo design, alphabet characters, a signature, and a character representation.

* * * * *